United States Patent
Wang et al.

(10) Patent No.: US 7,440,037 B2
(45) Date of Patent: *Oct. 21, 2008

(54) ANTI-ALIASING CHARACTERS FOR IMPROVED DISPLAY ON AN INTERLACED TELEVISION MONITOR

(75) Inventors: Yu-Rong Wang, Beijing (CN); You-Shun Liu, Beijing (CN); Zhi-Guang Zhou, Beijing (CN); Shan Xu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 446 days.

This patent is subject to a terminal disclaimer.

(21) Appl. No.: 11/195,175

(22) Filed: Aug. 2, 2005

(65) Prior Publication Data

US 2006/0092176 A1 May 4, 2006

Related U.S. Application Data

(63) Continuation of application No. 10/154,770, filed on May 23, 2002, now Pat. No. 6,995,803.

(51) Int. Cl.
*H04N 5/21* (2006.01)

(52) U.S. Cl. .................. 348/607; 348/606; 345/611; 345/613

(58) Field of Classification Search .................. 348/607, 348/625, 606, 447; 345/611, 613, 616, 617; 382/269
See application file for complete search history.

(56) References Cited

U.S. PATENT DOCUMENTS

| 5,910,805 | A | 6/1999 | Hickey et al. |
| 5,940,080 | A | 8/1999 | Ruehle et al. |
| 6,188,385 | B1 * | 2/2001 | Hill et al. ............ 345/614 |
| 6,421,060 | B1 | 7/2002 | Luken |
| 7,002,597 | B2 * | 2/2006 | Arnold et al. ............ 345/611 |

* cited by examiner

*Primary Examiner*—M. Lee
(74) *Attorney, Agent, or Firm*—Lee & Hayes, PLLC

(57) ABSTRACT

Anti-aliasing characters for improved display on an interlaced television monitor is described. In one implementation, an expanded character is generated by increasing a character's original dimensions. The expanded character includes multiple sub-blocks and each sub-block includes multiple pixels. The pixels of each sub-block are mapped to a single destination color that is based on specific numbers of foreground pixels in the sub-block and a particular number of gray levels used to represent the character. Subsequent to this mapping, the expanded character is scaled back to its original size.

16 Claims, 10 Drawing Sheets

CONVERT PIXELS OF THE CURRENT BLOCK TO A SINGLE DESTINATION COLOR
1016

1302

DETERMINE THE NUMBER OF PIXELS IN THE BLOCK BEING PROCESSED THAT REPRESENT THE FOREGROUND COLOR (THE ACTUAL CHARACTER) AS OPPOSED TO THE BACKGROUND COLOR

1304

MAP THE DETERMINED NUMBER OF PIXELS (GRAY VALUE OF THE BLOCK) TO A PARTICULAR GRAYSCALE DESTINATION COLOR

*Fig. 13*

ANTI-ALIASING CHARACTERS FOR IMPROVED DISPLAY ON AN INTERLACED TELEVISION MONITOR

BACKGROUND

This application is a continuation of U.S. patent application Ser. No. 10/154,770 filed on May 23, 2002, titled "Anti-Aliasing Characters for Improved Display on an Interlaced Television Monitor", which is hereby incorporated by reference.

BACKGROUND

Televisions monitors are typically designed to display a composite video signal with a frame refresh rate of either 70 Hz or 60 Hz, wherein each frame consists of two interlaced fields. One field includes all of the odd lines of the frame. The other field includes all of the even fields of the frame. A refresh rate of 60 Hz or 70 Hz means that the two interlaced fields are alternately displayed on a television monitor at a rate of either 60 or 70 half-frames (interlaced) per second.

An artifact of this arrangement is that fine details with high contrast, such as thin white lines on a black background, may be contained only within one of these fields. This causes fine details to flicker on a television display because the field which contains the fine detail is refreshed at half the frequency of the entire frame and is alternated with the other field, which does not contain the fine detail. This flickering often causes detailed images such as digital images (e.g., Web pages, font characters, bit-mapped images, and so on), which were originally designed for display on a computer monitor to be difficult to read on an interlaced television display; especially the display of characters (e.g., letters, numbers punctuation, etc.) that are output onto a television monitor based on structurally intricate or complex fonts such as East Asian fonts.

The following described arrangements and procedures address this limitation and other limitations of traditional systems and procedures to prepare font characters for display on interlaced monitors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Anti-aliasing characters for improved display on an interlaced television monitor is described. In one implementation, an expanded character is generated by increasing a character's original dimensions. The expanded character includes multiple sub-blocks and each sub-block includes multiple pixels. The pixels of each sub-block are mapped to a single destination color that is based on specific numbers of foreground pixels in the sub-block and a particular number of gray levels used to represent the character. Subsequent to this mapping, the expanded character is scaled back to its original size.

BRIEF DESCRIPTION OF THE DRAWINGS

The same numbers are used throughout the drawings to reference like features and components.

FIG. 13 shows further aspects of an exemplary procedure of FIG. 10 to generate a special anti-aliased character for display on an interlaced monitor. More specifically, FIG. 13 shows further aspects of block 1016 of FIG. 10, wherein pixels of each block of an expanded character are converted to a single destination color.

DETAILED DESCRIPTION

The following description sets forth exemplary subject matter to anti-alias characters for improved display on an interlaced monitor. The subject matter is described with specificity to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Overview

Conventional anti-aliasing techniques were not designed to address differences of structural complexity between various character sets when preparing characters for display on an interlaced television monitor. For instance, Latin based character sets are substantially simple in structure as compared to the structure of a number of East Asian character sets (e.g, Chinese, Korean, and/or Japanese characters).

One example of this structural difference is the relative use of vertical and/or horizontal lines in character representation. East Asian alphabets typically utilize many horizontal lines to represent characters. In contrast, Latin alphabets are typically dominant with respect to the use of vertical lines to represent characters. Because these structural differences are not taken into account by conventional image processing techniques, potentially illegible and aesthetically unpleasing structurally complex characters are typically displayed on interlaced monitors; especially on interlaced monitors with substantially slow scan refresh rates.

These and other limitations of conventional anti-aliasing image processing techniques are described in further detail before describing the novel aspects of this invention.

Figure 1:
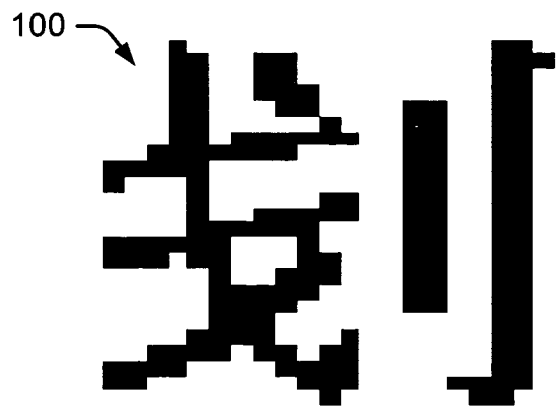
FIG. 1 shows an example of an aliased character based on a font that was designed with substantially smooth curves and lines.

FIG. 1 shows an example of an aliased character 100 based on a font (e.g., a mapped, true type, or ClearType® font) that was designed with substantially smooth curves and lines. The aliased character 100 is generated by scan converting, or increasing the resolution of a corresponding font character for display on a monitor. The curves and lines of the aliased character 100 are jagged (i.e., stairstep-like lines) at the higher resolution required by the monitor. Conventional anti-aliasing techniques are typically utilized to smooth out these jagged edges and curves of the character 100 prior to display on the monitor.

Figure 2:
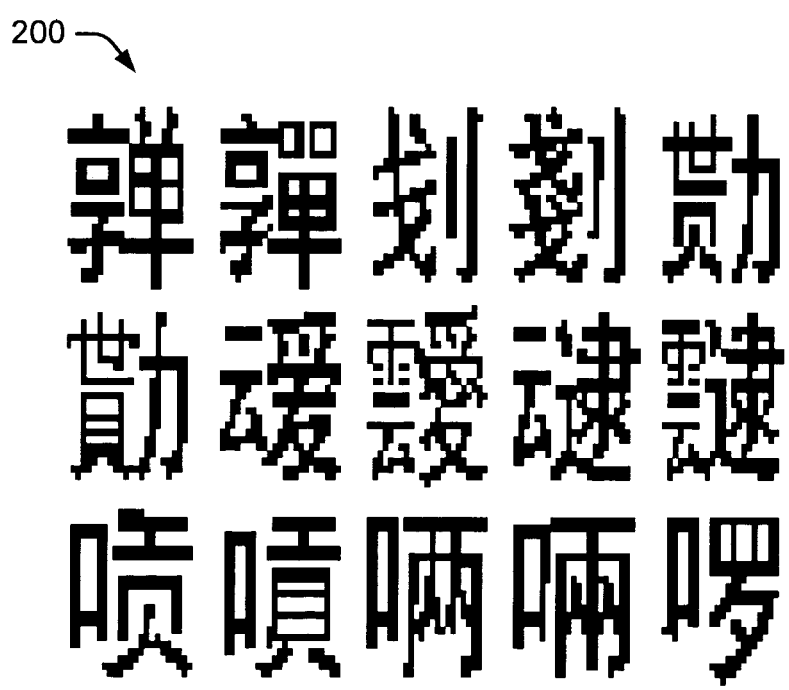
FIG. 2 shows an example of aliased text characters as they may appear when displayed on a television screen; the aliased text being potentially illegible and fatiguing to read.

FIG. 2 shows an example of aliased text characters 200 as they may appear when displayed on a television screen. The aliased text 200 is potentially illegible and fatiguing to read.

Figure 3:
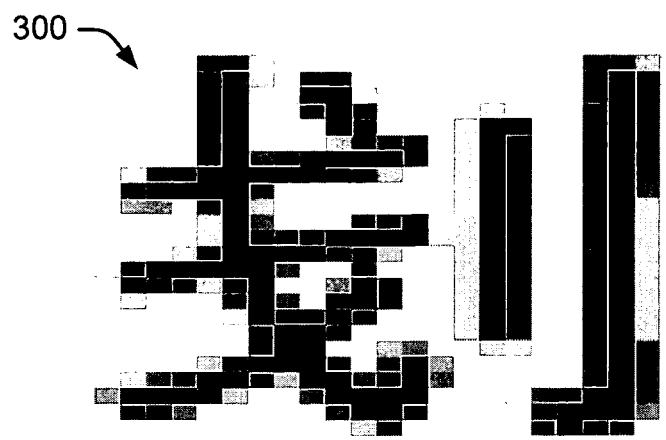
FIG. 3 shows a conventional anti-aliased character, wherein aliased or jagged edges have been substantially removed.

FIG. 3 shows a conventional "anti-aliased" character 300, wherein aliased or jagged edges have been substantially removed from the corresponding character 100 (ideally, the character's edges/curves are as smooth as those of the corresponding font from on which the character is based). To accomplish this, the aliased character 100 is essentially surrounded with intermediate shades of gray for grayscale display, or color for color display.

The smoothness and contrast to the conventional anti-aliased character 300 has been somewhat improved for display on a computer monitor. This is due in part because computer monitors are not interlaced and typically display digital images at high resolutions (e.g., 440×380 pixels-per-square inch, or greater) and substantially high scanline refresh rates (e.g., refresh rates of greater than or equal to 120 MHz are not uncommon). However, even though the conventional anti-aliased character 300 is substantially sufficient for display on a computer monitor, the anti-aliased character 300 is typically very difficult to read and substantially unaesthetic when displayed on an interlaced television monitor.

Figure 4:
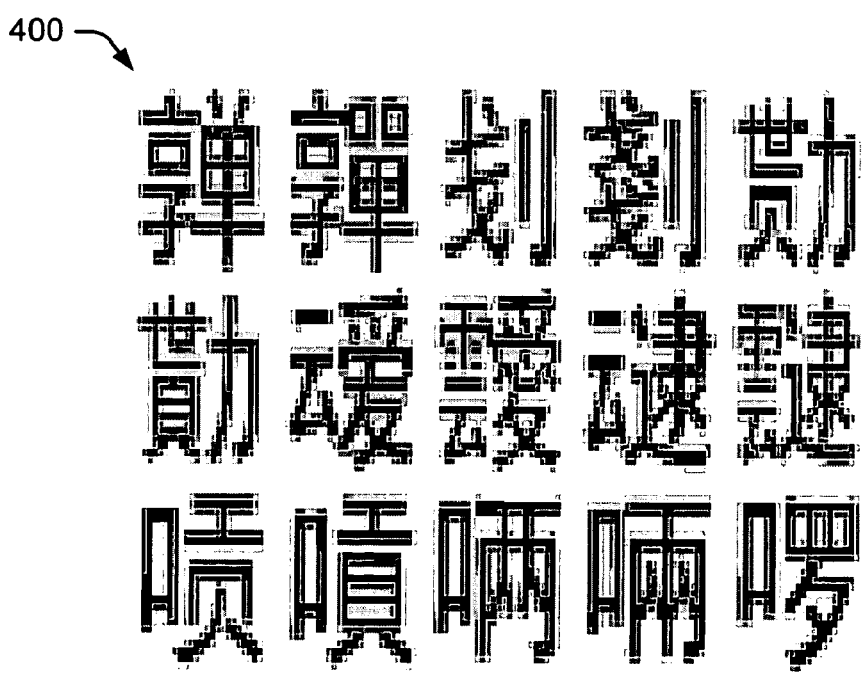
FIG. 4 shows conventional anti-aliased text displayed on an interlaced television monitor.

For instance, FIG. 4 shows conventional anti-aliased text 400 as it would appear when displayed on an interlaced television monitor. Notice that the conventional anti-aliased text 400 is aesthetically unpleasing and potentially illegible (e.g., blurry) because it lacks sufficient contrast on the white background. The unaesthetic nature and blurriness of conventional anti-aliased text is potentially increased when the conventional anti-aliased text is presented on an interlaced monitor due to blurring and flickering caused by the alternate display of frame fields and corresponding slow refresh scanline rates (e.g., 60-70 Hz).

Exemplary aspects of arrangements and procedures to display special anti-aliased characters for improved display on an interlaced monitor are now described.

An Exemplary System

Figure 5:
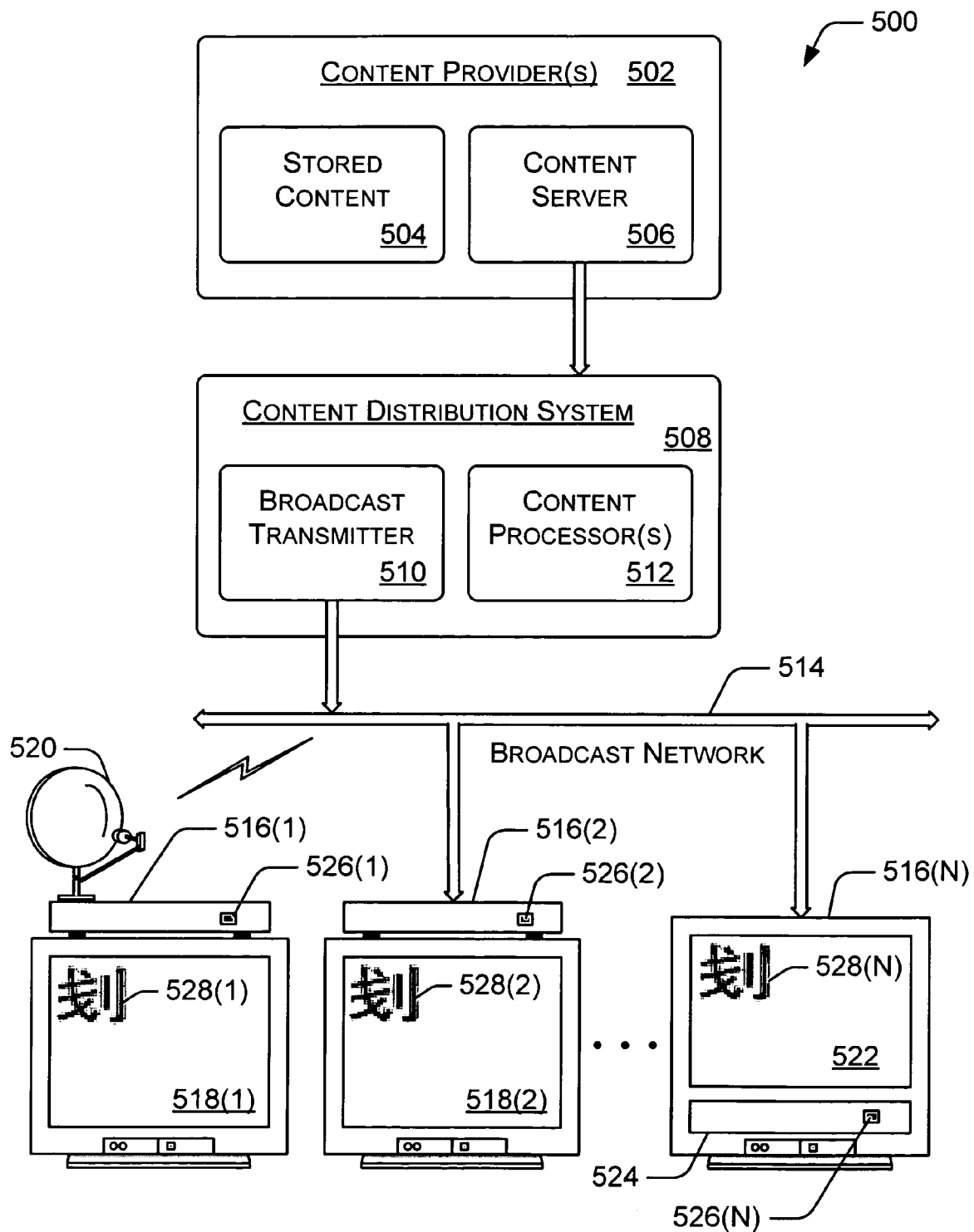
FIG. 5 illustrates an exemplary environment in which the methods and systems to anti-alias characters of a font for improved display on an interlaced monitor may be implemented.

FIG. 5 illustrates an exemplary environment 500 in which the methods and systems to anti-alias characters of a font for improved display on an interlaced monitor may be implemented. One or more content providers 502 include stored content 504 and a content server 506. Content server 506 controls the movement of content (including stored content 504) from the content provider 502 to a content distribution system 508, which is coupled to the content provider. Additionally, the content server 506 controls the movement of live content (e.g., content that was not previously stored by the content provider) and content stored at other locations to the content distribution system.

The content distribution system 508 contains a broadcast transmitter 510 and one or more content processors 512. Broadcast transmitter 510 broadcasts signals (e.g., cable television signals) across a broadcast network 514, such as a cable television network. Broadcast network 514 may include wired or wireless media using any broadcast format or broadcast protocol. Content processor 512 processes the content received from content provider 502 prior to transmitting the content across the broadcast network 514 to one or more client devices 516(1) through 516(N). A particular content processor may encode or otherwise process the received content into a format that is understood by the client devices 516. Although FIG. 5 shows a single content provider 502 and a single content distribution system 508, a particular environment may include any number of content providers coupled to any number of content distribution systems.

Client devices 516(1) through 516(N) provide digital broadcast content received from content distribution system 508 to respective televisions 518 and 522. A client device 516 is also referred to as a set-top box, game console or a satellite receiving device. A particular client device 516 may be coupled to any number of televisions 518. Similarly, any number of client devices 516 may be coupled to a television 518.

In the illustrated implementation, a client device 516(1) receives broadcast content from a satellite-based transmitter via a satellite dish 520. Client device 516(1) is coupled to a television 518(1) for presenting the content received by the client device (i.e., Web pages, audio data, video data, etc.) as well as a graphical user interface. Another client device 516(2) is coupled to receive broadcast content from broadcast network 514 and provide the received content to a television 518(2). Another client device 516(N) is a combination of a television 522 and a set-top box 524. In this example, the various components and functionality of the set-top box are incorporated into the television, rather than using two separate devices. The set-top box incorporated into the television may receive broadcast signals via a satellite dish (similar to satellite dish 520) and/or via broadcast network 514. In alternate embodiments, client devices 516 may receive broadcast signals via the Internet or any other broadcast medium.

Figure 6:
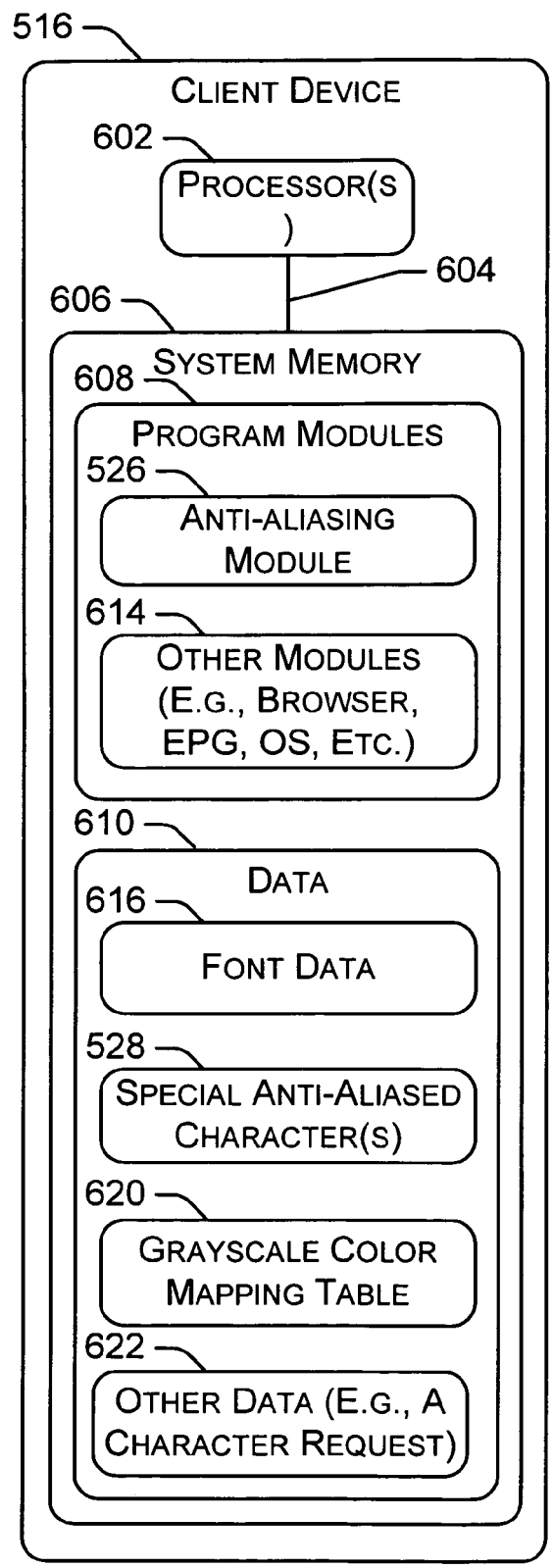
FIG. 6 is a block diagram showing further aspects of the exemplary client device of FIG. 5.
Figure 7:
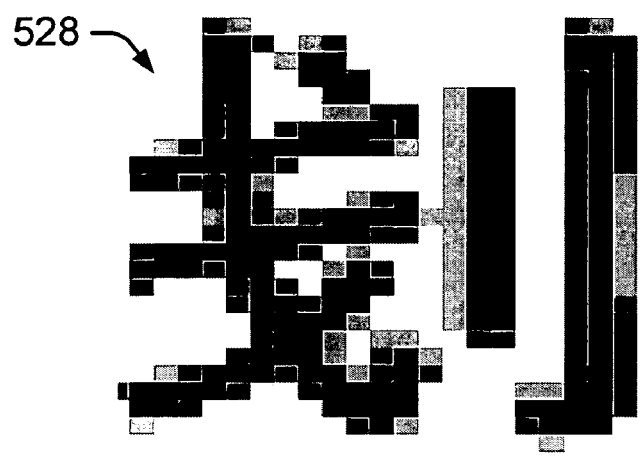
FIG. 7 shows aspects of an exemplary special anti-aliased character, which is substantially clear and does not exhibit flickering when displayed on an interlaced monitor.
Figure 8:
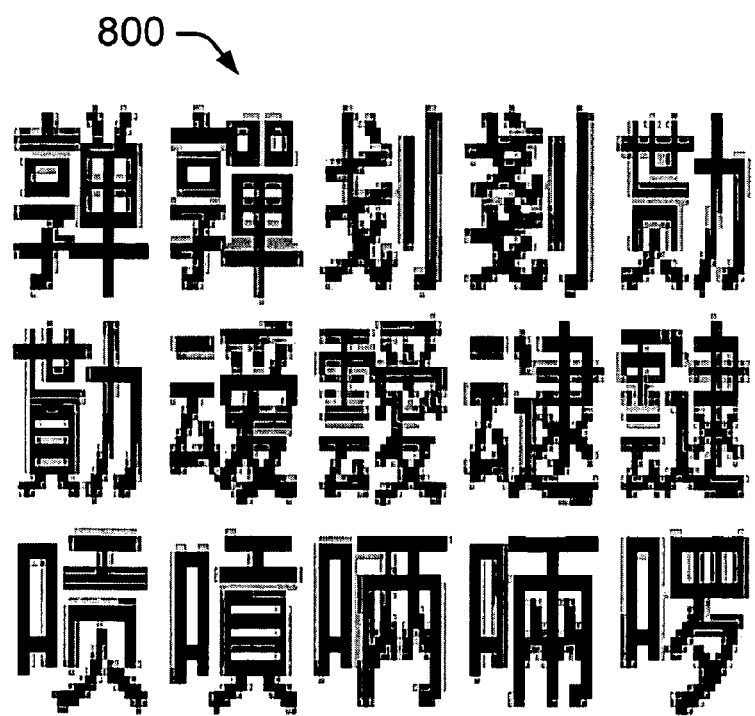
FIG. 8 shows aspects of an exemplary special anti-aliased text as it may appear when displayed on an interlaced television screen. The special anti-aliased text is based on special anti-aliased characters of FIG. 7.
Figure 9:
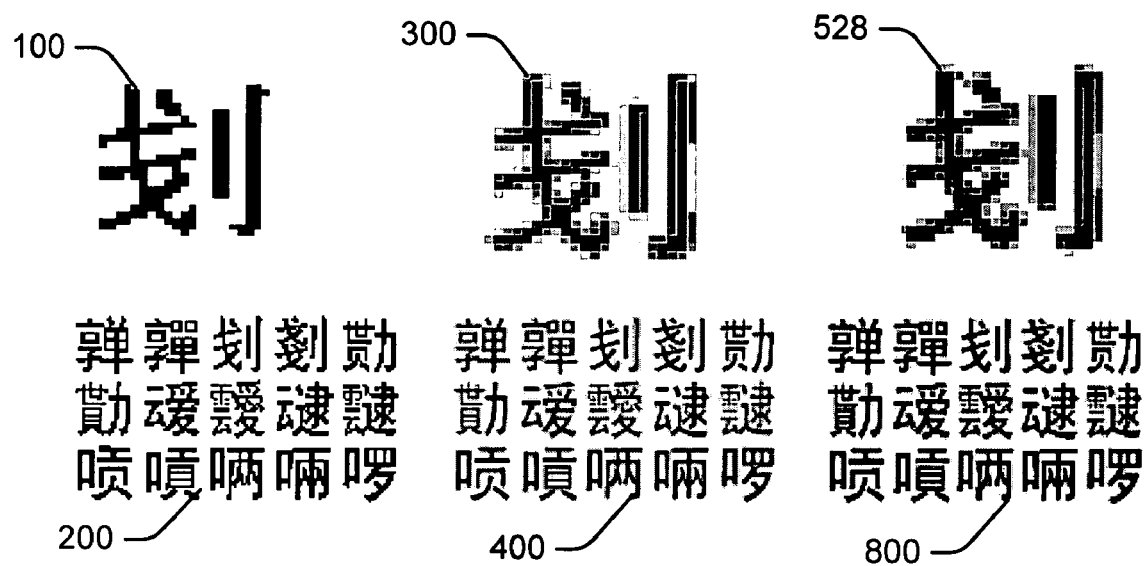
FIG. 9 provides a side-by-side comparison of various aspects of: an aliased character of FIG. 1 with corresponding aliased text of FIG. 2; a conventional anti-aliased character of FIG. 3 with corresponding conventional anti-aliased text of FIG. 4; and a special anti-aliased character of FIGS. 6 and 7 with corresponding special anti-aliased text of FIG. 8.

Each client device 516 hosts a respective anti-aliasing program module 526 to generate special anti-aliased characters 528 (e.g., 528(1)-528(N)) for improved legibility and less flicker when displayed on respective interlaced television screens 518 and 522 (see, also the special anti-aliased character 528 of FIGS. 6, 7, and 9, and the special anti-aliased text 800 of FIGS. 8 and 9). In one implementation, anti-aliasing program module 526 is implemented as a device driver that executes at the client device.

The anti-aliasing module 526 generates special anti-aliased characters 528 by expanding a character, having an original size, by a factor. The expanded character is divided into multiple blocks, where the actual number of blocks is a function of the expansion factor. Each expanded block has a corresponding number of pixels.

For each block of the expanded character, the anti-aliasing module 526 identifies a number of pixels in the block that correspond to a foreground color of the character font and maps the number of pixels to a grayscale color value. The module 526 then converts the mapped pixels to a destination color based at least in part on the grayscale color value and reduces the font character back to its original pre-expanded size to generate a special anti-aliased character 528.

The generated special anti-aliased character 528 provides for potentially less eye-straining flicker and improved legibility when displayed on respective interlaced television screens 518 and 522. It can be appreciated that multiple special anti-aliased characters 528 are represented as special anti-aliased text (e.g., text 800 of FIGS. 8 and 9)

An Exemplary Client Device

FIG. 6 is a block diagram showing further aspects of the exemplary client device 516 of FIG. 5. The client device 516 includes one or more processors 602 coupled across a bus 604 to a system memory 606. Bus 604 is used by the processor 602 to transfer data between the processor 602, system memory 606, and/or other components of the client device (e.g., one or more tuners, broadcast signal encoders/decoders, and so on).

For instance, the bus 604 represents one or more of any of several types of bus structures, for example, a memory bus or memory controller, a peripheral bus, an accelerated graphics port, and a processor or local bus using any of a variety of bus architectures (e.g., Industry Standard Architecture (ISA), Micro Channel Architecture (MCA), Enhanced ISA (EISA), Video Electronics Standards Association (VESA), Peripheral Component Interconnects (PCI) bus architecture, and so on).

The system memory 606 includes a variety of computer-readable media that is accessible by the processor 602, for example, volatile random access memory (RAM), non-volatile read-only memory (ROM), flash memory (EEPROM), removable and non-removable storage media, and so on. The RAM component of system memory 606 typically contains at least portions of computer-program code or program modules 608 and/or data 610 that are immediately accessible to and/or presently be executed or operated on by the processor 602. The ROM and/or flash memory components of system memory 606 also include at least portions of program modules 608 and/or data 610 (e.g., BIOS 614, and font data 616 to describe various aspects of one or more character sets such as an East Asian character set).

Generally, program modules 608 include routines, programs, objects, components, data structures, etc., that perform particular tasks or implement particular abstract data types. Not only is the processor 602 configured to fetch and execute computer-executable instructions 608 and data 610 respectively from portions of memory 606, but portions of program modules 608 may be executed on a remote processing device that is linked to the client device 516 through a communications network. Accordingly, program modules 608 and data 610 may be located in both local and remote computer storage media including memory storage devices that are coupled to the client device 516.

In this illustration, program modules 608 include, for example, anti-aliasing module 526 to generate one or more special anti-aliased characters 528 of FIG. 5 from one or more fonts 616 for potentially improved display on an interlaced monitor. The anti-aliasing module 526 generates these special anti-aliased characters 528 regardless of whether the characters 528 are derived from structurally simple fonts (e.g., Latin character sets) or structurally complex fonts 616 (e.g., Asian character sets). (Aspects of an exemplary procedure of the anti-aliasing module 526 are described in greater detail below in reference to FIGS. 10-13).

Program modules 608 portion of memory 606 further includes, for example, other modules 614 (e.g., an operating system (OS) such as the WINDOWS CE® embedded operating system, a basic input/output system (BIOS) 614 (i.e., basic routines that help to transfer information between components within the client device 516 during client device 516 start-up), device drivers to communicate with other electronic and computing devices, and so on).

Data 610 includes font data 616 (e.g., one or more font files), one or more special anti-aliased characters 528 or text, and a grayscale mapping table 620, and other data 622 such as a request from an application for a character. Font data includes one or more fonts that are utilized by the anti-aliasing module 526 to generate special anti-aliased character 528. Grayscale mapping table 620 is used by anti-aliasing module 526 to map color characteristics of a character from font data 620 to destination colors represented in special anti-aliased character(s) 528. (Grayscale mapping table 620 is discussed in greater detail below in reference to TABLE 2 and FIGS. 10-11).

An Exemplary Special Anti-Aliased Character

FIG. 7 shows further aspects of an exemplary special anti-aliased character 528 of FIGS. 5 and 6. When displayed on an interlaced television monitor, special anti-aliased character 528 is substantially clear at the edges and darker in the center, providing for substantially improved legibility as compared to conventional aliased and anti-aliased characters. The special anti-aliased character 528 utilizes sixteen (16) gray levels to anti-alias the edges of the character 528.

FIG. 8 shows aspects of an exemplary special anti-aliased text 800 as it may appear when displayed on an interlaced television screen. The special anti-aliased text is generated in a similar manner as the special anti-aliased characters 528 of FIGS. 6 and 7.

FIG. 9 provides a side-by-side comparison of various aspects of: an aliased character 100 (FIG. 1) with corresponding aliased text 200 (FIG. 2); a conventional anti-aliased character 300 (FIG. 3) with corresponding conventional anti-aliased text 400 (FIG. 4); and a special anti-aliased character 528 (FIGS. 6 and 7) with corresponding special anti-aliased text 800 (FIG. 8). Specifically, FIG. 9 shows that the special anti-aliased character 528 and the special anti-aliased text 800 are substantially clear and do not exhibit as many potentially distracting flickering properties as compared to aliased characters/text and conventional anti-aliased characters/text when displayed on an interlaced television monitor.

An Exemplary Procedure to Generate a Special Anti-Aliased Character

Figure 10:
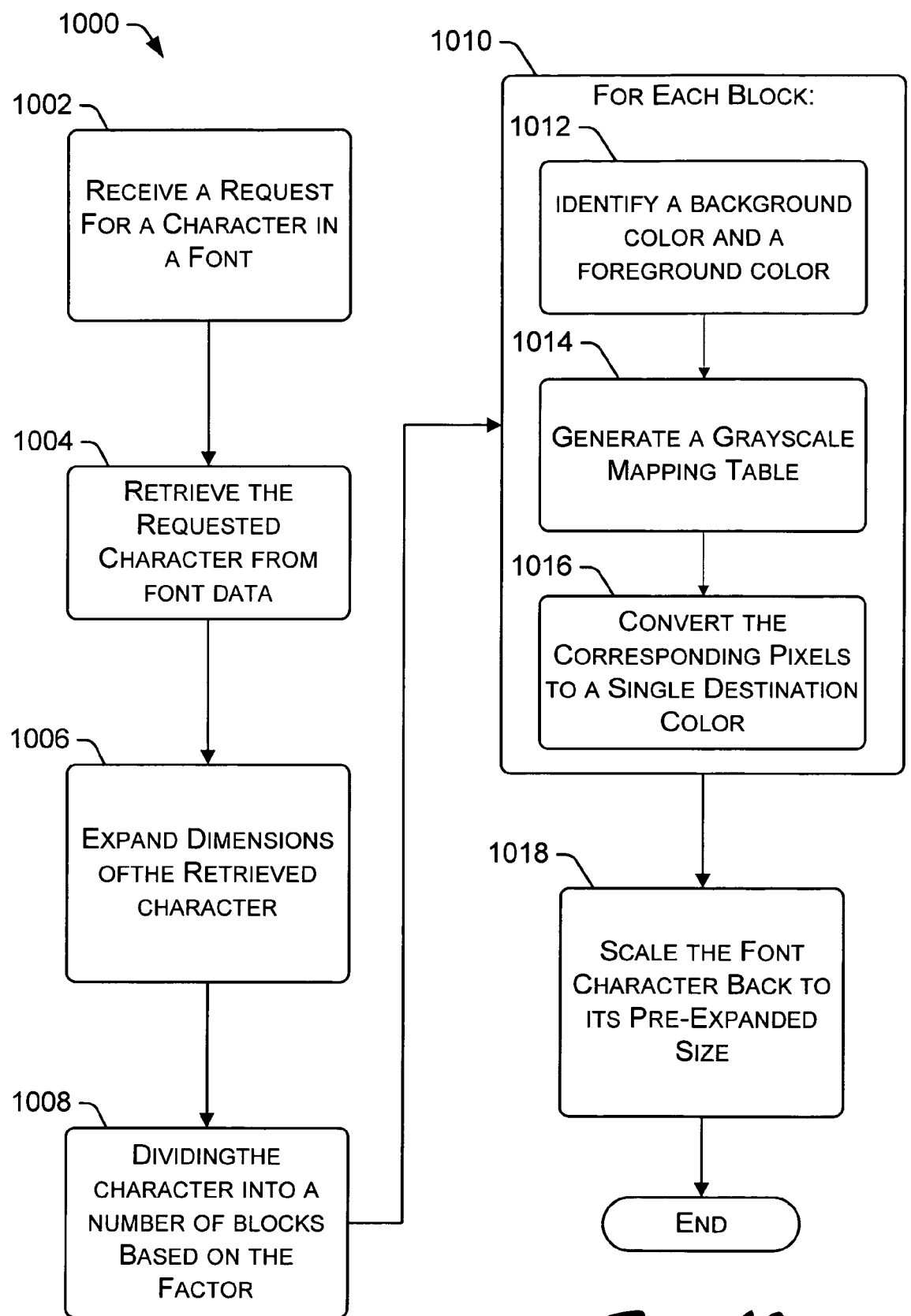
FIG. 10 shows aspects of an exemplary procedure to generate a special anti-aliased character for display on an interlaced monitor.

FIG. 10 shows aspects of an exemplary procedure 1000 to generate a special anti-aliased character (e.g., character(s) 528 of FIGS. 5-7) for display on an interlaced monitor such as a television monitor 518 or 522 of FIG. 5. At block 1002, the anti-aliasing module 526 receives a request (e.g., request 622 of FIG. 6) from an application (e.g., a Web browser, 614 of FIG. 6, a broadcast program guide, etc.) for a character (e.g., a character in font data 616 of FIG. 6) in a particular font. The request specifies a character size.

Figure 11:
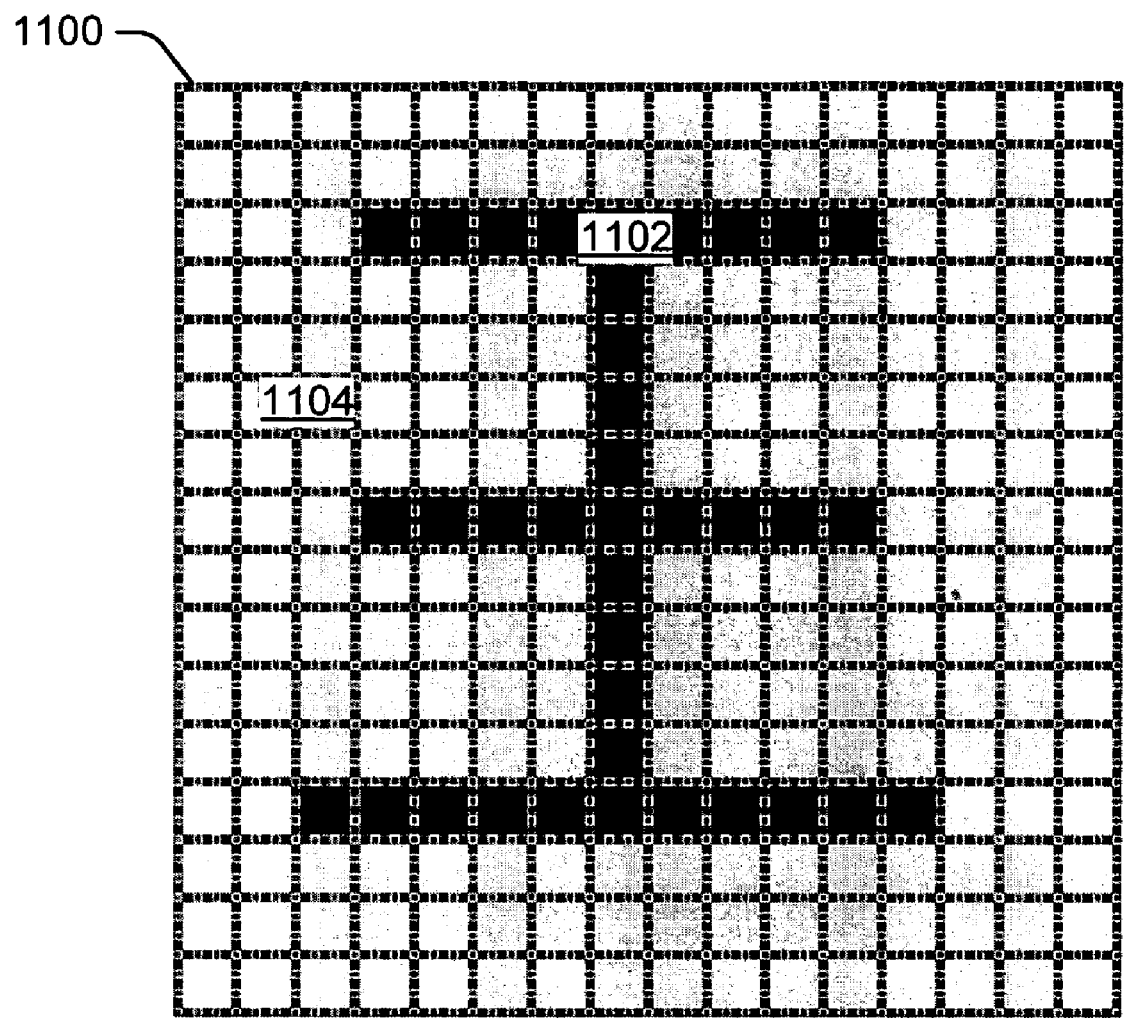
FIG. 11 shows an exemplary character font in an original requested size.

FIG. 11 shows such an exemplary character font 1100 that may be requested by an application (block 1002). In this example, the exemplary character 1100 is based on a structurally complex Chinese character set font. However, the exemplary character 1100 could have been selected from any font (e.g., Latin fonts, symbol fonts, mathematical fonts, etc.) that is available from font data 616.

The size of the exemplary character 1100 is sixteen (16) pixels-by-sixteen (16) pixels, which specifies the character's width and height. The character size specified by the application is application dependent and may be based on any number of various criteria such as application or user display preferences.

In this example, the character 1100 includes an exemplary foreground color 1102 of red ("R") that is identified by the darkest gray colors of FIG. 11. The RGB color value for red is (255, 0, 0). The character 1100 also includes an exemplary background color 1104 of yellow that is identified by the lighter gray colors of FIG. 11 that surround the darker gray colors 1102. The RGB value of yellow is equal to (255, 255, 0). These exemplary foreground 1102 and background 1104 RGB values are utilized later in this exemplary procedure 1000 (i.e., blocks 1012 and 1016) to generate a special anti-aliased character for display on an interlaced monitor. The exemplary foreground color 1102 and the exemplary background color 1104 of the character 1100 can be of any respective colors and the particular values used in this example are utilized only for purposes of demonstration.

At block 1004, the anti-aliasing module 526 retrieves the requested character from font data 616. At block 1006, the anti-aliasing module 526 increases the dimensions of the requested character (e.g., character 1100) by multiplying the character's size by a particular factor. The particular factor is based on the particular number of gray levels used in representation of the character. The factor may range from $2^1 \times 2^1$ to $2^4 \times 2^4$ gray levels. For a conventional computer monitor, the number of gray levels is typically 16×16 or 256.

In one implementation, $2^2 \times 2^2$ or 4×4 or 16 gray levels (i.e., the particular factor of block 1004) are used. This is because 16 gray levels requires less memory to process in a low-resource environment (meaning that a client such as a cable and satellite set-top box has limited memory and/or processing resources), wherein the amount of memory reserved for program data and processing is limited. Additionally, characters produced according to procedure 1000 and displayed on an interlaced television monitor with 16 levels of gray exhibit substantial legibility.

Figure 12:
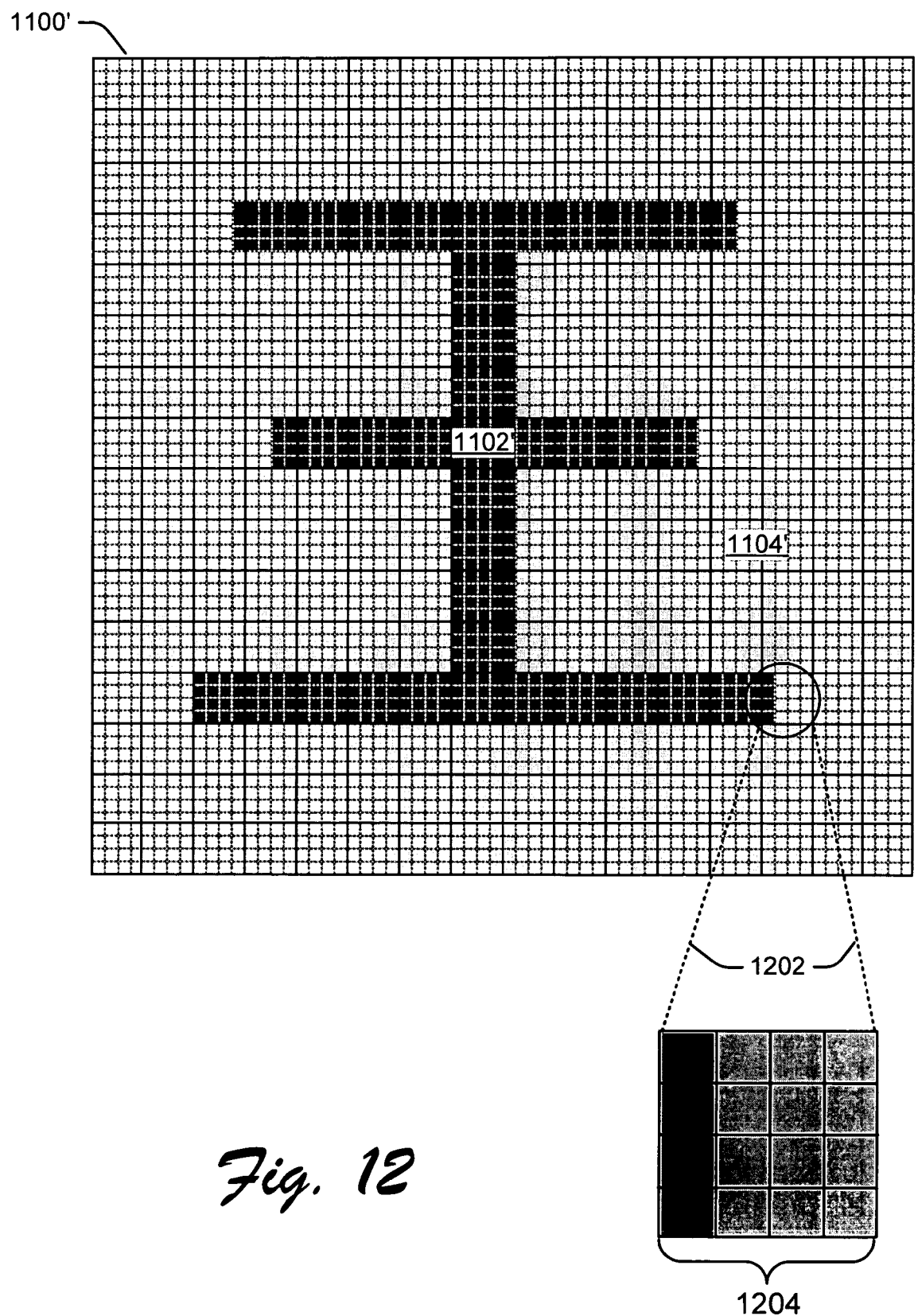
FIG. 12 shows aspects of the exemplary character font of FIG. 11 that was expanded in size (i.e., expanded in both width and height dimensions).

FIG. 12 shows aspects of the exemplary expanded character 1100' produced by multiplying the dimensions of the font character 1100 of FIG. 11 by a factor. In this illustration, which is an example, the factor is four (4) in both width and height dimension. This means that prior to the operation at block 1006, the dimensions of the exemplary character were originally 16×16 pixels and subsequent to the operation at block 1006, the character has been expanded to 64×64 pixels.

Referring to the procedure of FIG. 10, at block 1008, the anti-aliasing module 526 divides the expanded character (block 1006) into a number of blocks such that the number of blocks in the width dimension is the same as the number of blocks in the height dimension. The particular number of blocks that the expanded character is divided into is based on the factor. For instance, in the example of FIG. 12, the original character was expanded by a factor of 4 both in the height and width dimensions. This produced an expanded character of 64×64 pixels. Dividing the dimensions of the expanded character by the factor provides 16×16 blocks, wherein each block consists of 16 corresponding pixels.

Block 1010 of procedure 1000 consists of three (3) operations that are respectively performed on each block (e.g., each of the 16×16 blocks) of pixels in the expanded character (block 1006). These 3 operations are identified by blocks 1012 through 1016. Specifically, at block 1012, the anti-aliasing module 526 identifies the foreground color 1102' and the background color 1104' with respect to the present block (e.g., see the explanation of background foreground color provided at the description for block 1002).

For instance, call-out 1202 of FIG. 12 illustrates a block 1204 of the expanded character font 1100'. The block 1204 consists of a number of foreground pixels and background pixels. The foreground pixels of this example are represented by the four (4) darker sub-blocks of block 1204. The background pixels of this example are represented by the twelve (12) lighter sub-blocks of block 1204.

At block 1014 of FIG. 10, the anti-aliasing module 526 generates a factor-level RGB mapping table 620 of FIG. 6 based on the background foreground color using following algorithm of TABLE 1:

TABLE 1

Exemplary Formula for Determining a Destination Color for an Expanded Character Block R = (Rf* gray/factor) + (Rb*(factor − gray)/factor);
G = (Gf* gray/factor) + (Gb*(factor − gray)/factor); and
B = (Bf* gray/factor) + (Bb*(factor − gray)/factor).

"Factor" is equal to the particular number of gray levels used in representing the character that is being anti-aliased. Here it is 4×4 or 16. "Rf" is equal to the red aspect of the mapped foreground color (e.g., foreground color 1102). "Gf" is equal to the green aspect of the mapped foreground color. "Bf" is equal to the blue aspect of the mapped foreground color. "Rb" is equal to the red aspect of the mapped background color (e.g., background color 1104). "Gb" is equal to the green aspect of the mapped background color. "Bb" is equal to the blue aspect of the mapped background color. And, gray is equal to the number of pixels in the block that represent the foreground color. Its value range is decided by the factor value. Here its range is 0-16.

As discussed above, the factor represents the number of gray level used to represent the character. In this implementation, the factor is 4×4 or 16, so a 16-level RGB mapping table is generated. TABLE 2 shows an exemplary grayscale color mapping table 620.

TABLE 2

An Exemplary Grayscale Color Mapping Table

| Foreground | | RGB(255,0,0) | Rf = 255, Gf = 0, Bf = 0 |
|---|---|---|---|
| Background | | RGB(255,255,0) | Rb = 255, Gb = 255, Bb = 0 |

| Gray | | R(red)<br>Rf*Gray/16 + Rb*(16-Gray)/16 | G(green)<br>Gf*Gray/16 + Gb*(16-Gray)/16 | B(blue)<br>Bf*Gray/16 + Bb*(16-Gray)/16 |
|---|---|---|---|---|
| 16 | | 255 | 0 | 0 |
| 15 | | 255 | 16 | 0 |

TABLE 2-continued

An Exemplary Grayscale Color Mapping Table

| Foreground | | RGB(255,0,0) | Rf = 255, Gf = 0, Bf = 0 |
| Background | | RGB(255,255,0) | Rb = 255, Gb = 255, Bb = 0 |

| Gray | | R(red)<br>Rf*Gray/16 + Rb*(16-Gray)/16 | G(green)<br>Gf*Gray/16 + Gb*(16-Gray)/16 | B(blue)<br>Bf*Gray/16 + Bb*(16-Gray)/16 |
|---|---|---|---|---|
| 14 | | 255 | 32 | 0 |
| 13 | | 255 | 48 | 0 |
| 12 | | 255 | 64 | 0 |
| 11 | | 255 | 80 | 0 |
| 10 | | 255 | 96 | 0 |
| 9 | | 255 | 112 | 0 |
| 8 | | 255 | 128 | 0 |
| 7 | | 255 | 143 | 0 |
| 6 | | 255 | 159 | 0 |
| 5 | | 255 | 175 | 0 |
| 4 | | 255 | 191 | 0 |
| 3 | | 255 | 207 | 0 |
| 2 | | 255 | 223 | 0 |
| 1 | | 255 | 239 | 0 |
| 0 | | 255 | 255 | 0 |

Mapping table 620 of TABLE 2 illustrates sixteen (16) values of grayscale color mapped to specific RGB colors. It can be appreciated that the grayscale color mapping table 620 may represent fewer of more grayscale color values as a function of how many grayscale color values are used to represent a character (i.e., the factor). With respect to the immediate example, the value 16 maps to the RGB color of (255, 0, 0). Thus, if 16 pixels of the currently processed block of the expanded character correspond to the foreground color, a grayscale color of (255, 0, 0) is identified or mapped.

At block 1016, the anti-aliasing module 526 converts the block's corresponding pixels to a single destination color. This conversion is based on a number of criteria, including, the determined foreground and background colors, and the particular number of gray levels used (i.e., the gray levels used here is 4×4 or 16). Further aspects of the operation of block 1016 are now described in reference to FIG. 13.

FIG. 13 shows the conversion block 1016 of FIG. 10 in more detail, wherein pixels of each block in an expanded character are converted to a single destination color. At operation 1302, for a given expanded block 1204, the anti-aliasing module 526 determines the number of pixels in the processed block that represent the determined foreground color, which is the actual character color as opposed to the background color.

At operation 1304, the anti-aliasing module 526 maps the determined number of pixels to a particular grayscale color value. This grayscale color is the destination color of the processed block. For instance, if 16 pixels in the currently processed block are used to specify foreground color, then the grayscale value that corresponds to the value 16 is identified and correspondingly destination color value (255, 0, 0) is also identified.

Referring now to block 1204 of FIG. 12, there are 4 pixels of the processed block 1204 that correspond to the determined foreground color. In this example, the grayscale (destination) color mapping table 620 as shown in Table 2, illustrates that a grayscale (destination) color of (255, 191, 0) maps to an expanded block that has 4 foreground pixels.

Returning to FIG. 10, at block 1018, after the operations of blocks 1016 and 1018 have been performed for each block of the expanded character (block 1006), the anti-aliasing module 526 scales the expanded font character back to the font's original size (i.e., the size of the character prior to being expanded at block 1006) for subsequent display on an interlaced monitor.

In this manner, the anti-aliasing module 526 generates a special anti-aliased character 528 (e.g., see the special anti-aliased character 528 of FIGS. 6 and 7).

Conclusion

Although anti-aliasing characters for improved display on an interlaced television monitor has been described been described in language specific to structural features and methodological operations, it is to be understood that anti-aliasing characters for improved display on an interlaced television monitor, as defined the appended claims, is not necessarily limited to the specific features or operations described. Rather, the specific features and operations are disclosed as preferred forms of implementing the claimed subject matter.

The invention claimed is:

1. A method comprising:
increasing dimensions of a character having an original size to generate an expanded character, the character being based on a particular number of gray levels, the expanded character comprising of a plurality of sub-blocks, each sub-block comprising a respective plurality of pixels; and
generating a special anti-aliased character by:
identifying a number to indicate how many foreground color pixels are in the sub-block:
mapping the identified number to a single destination color that is based at least in part on the identified number of foreground pixels in the respective pixels of the sub-block and the particular number of gray levels; and
scaling the expanded character back to the original size.

2. A method as recited in claim 1, wherein mapping the respective pixels of each sub-block to a single destination color is based on the following equation:

$$R=(Rf*gray/factor)+(Rb*(factor-gray)/factor); \quad (a)$$

$$G=(Gf*gray/factor)+(Gb*(factor-gray)/factor); \quad (b)$$

$$B=(Bf*gray/factor)+(Bb*(factor-gray)/factor); \quad (c)$$

wherein "factor" is equal to the particular number of gray levels, "Rf" is equal to a red aspect of the foreground color, "Gf" is equal to a green aspect of the foreground color, "Bf" is equal to a blue aspect of the foreground color, "Rb" is equal to a red aspect of background color, "Gb" is equal to a green aspect of the background color, "Bb" is equal to a blue aspect of the background color, and "gray" is a number that corresponds to sub-block foreground color pixels; and
wherein R, G, and B are the single destination color.

3. A method as recited in claim 1, further comprising:
receiving a request from an application for the character, the request specifying the original size;
obtaining the character from a font file; and
subsequent to generating the special anti-aliased character based on the character, communicating the special anti-aliased character to the application.

4. A computer-readable medium comprising computer-executable instructions executable by a processor to anti-alias a character, the computer-executable instructions comprising instructions for implementing a method as recited in claim 1.

5. A computer readable medium comprising computer-executable instructions executable by a processor to anti-alias a character, the computer-executable instructions comprising instructions for:
increasing dimensions of a character to generate an expanded character, the character being based on a number of gray levels, the expanded character comprising of a plurality of sub-blocks;
generating a special anti-aliased character by, for each sub-block:
(a) identifying a number to indicate how many foreground color pixels are in the sub-block; and
(b) mapping the number to a respective grayscale color value representing a single destination color of the sub-block.

6. A computer-readable medium as recited in claim 5, wherein determining the single destination color is based on the following equation:

$$R=(Rf*gray/factor)+(Rb*(factor-gray)/factor); \quad (a)$$

$$G=(Gf*gray/factor)+(Gb*(factor-gray)/factor); \quad (b)$$

$$B=(Bf*gray/factor)+(Bb*(factor-gray)/factor); \quad (c)$$

wherein "factor" is the particular number of gray levels used. "Rf" is equal to a red aspect of the foreground color, "Gf" is equal to a green aspect of the foreground color. "Bf" is equal to a blue aspect of the foreground color, "Rb" is equal to a red aspect of background color, "Gb" is equal to a green aspect of the background color, "Bb" is equal to a blue aspect of the background color, and "gray" is the number indicating how many foreground color pixels are in the sub-block; and
wherein the single destination color is (R, G, B).

7. A computer-readable medium as recited in claim 5, wherein the instructions for increasing dimensions of the character, the dimensions were increased from an original size, and wherein the computer-executable instructions further comprise, after instructions for determining the single destination color, instructions for scaling the expanded character back to the original size.

8. A computer-readable medium as recited in claim 5, further comprising instructions for:
receiving a request from an application for the character, the request specifying the original size;
obtaining the character from a font file;
subsequent to generating the special anti-aliased character:
(a) scaling the special anti-aliased character back to a pre-expanded size; and
(b) communicating the special anti-aliased character to the application.

9. A computing device to anti-alias a character, the computing device comprising:
a processor;
a memory coupled to the processor, the memory comprising computer-readable medium comprising computer-executable instructions executable by the processor for:
increasing dimensions of a character to generate an expanded character, the character being based on a particular number of gray levels, the expanded character comprising of a plurality of sub-blocks, each sub-block comprising a respective plurality of pixels;

identifying a number to indicate how many foreground color pixels are in the sub-block: and for each sub-block, mapping the identified number to a single destination color that is based at least in part on the identified number of foreground pixels in the respective pixels of the sub-block and the particular number of gray levels.

10. A computing device as recited in claim 9, wherein the computer-executable instructions for mapping the respective pixels of each sub-block are based on the following equation:

$$R=(Rf*gray/factor)+(Rb*(factor-gray)/factor); \quad (a)$$

$$G=(Gf*gray/factor)+(Gb*(factor-gray)/factor); \quad (b)$$

$$B=(Bf*gray/factor)+(Bb*(factor-gray)/factor); \quad (c)$$

wherein "factor" is the particular number of gray levels, "Rf" is equal to a red aspect of the foreground color, "Gf" is equal to a green aspect of the foreground color, "Bf" is equal to a blue aspect of the foreground color, "Rb" is equal to a red aspect of background color, "Gb" is equal to a green aspect of the background color, "Bb" is equal to a blue aspect of the background color, and "gray" is a number of sub-block foreground color pixels; and wherein R, G, and B represent color components of the single destination color.

11. A computing device as recited in claim 9, wherein before the computer-executable instructions for increasing dimensions of the character the character had an original size, and wherein after the computer-executable instructions for each sub-block that map sub-block pixels to a single destination color, the computer-executable instructions further comprise instructions for scaling each of the sub-blocks to generate a special anti-aliased character that is based on the original size.

12. A method to anti-alias a character, the method comprising expanding a character by a factor;

dividing the character into a plurality of blocks based on the factor, each block having a corresponding number of pixels;

for each block:

(a) identifying a number of pixels in the block that respectively correspond to foreground color of the character;

(b) mapping the number to a respective grayscale color value representing a single destination color of the sub-block; and (c) reducing dimensions of the character to a pre-expanded size.

13. A method as recited in claim 12, wherein the character is not a bitmap font.

14. A method as recited in claim 12, wherein the single destination color is based on one (1) of sixteen (16) possible levels of gray.

15. A method as recited in claim 12, wherein the single destination color is an RGB color identified based on the following:

$$R=(Rf*gray/factor)+(Rb*(factor-gray)/factor);$$

$$G=(Gf*gray/factor)+(Gb*(factor-gray)/factor);$$

$$B=(Bf*gray/factor)+(Bb*(factor-gray)/factor); \text{ and}$$

wherein "factor" is equivalent to a particular number of gray levels used to represent the character, "Rf" is equal to a red aspect of the foreground color, "Gf" is equal to a green aspect of the foreground color, "Bf" is equal to a blue aspect of the foreground color, "Rb" is equal to a red aspect of background color, "Gb" is equal to a green aspect of the background color, "Bb" is equal to a blue aspect of the background color, and "gray" is equal to a grayscale value based on a number of pixels of the corresponding pixels that represent the foreground color.

16. A method as recited in claim 12, after reducing dimensions of the character to the pre-expanded size, further comprising communicating the character to an application.

* * * * *